(12) United States Patent
Othmezouri et al.

(10) Patent No.: US 9,165,204 B2
(45) Date of Patent: Oct. 20, 2015

(54) METHODS AND SYSTEMS FOR SEMANTIC LABEL PROPAGATION

(75) Inventors: Gabriel Othmezouri, Brussels (BE); Ichiro Sakata, Brussels (BE); Roberto Cipolla, Cambridge (GB); Vijay Badrinarayanan, Cambridge (GB)

(73) Assignees: TOYOTA MOTOR EUROPE NV/SA, Brussels (BE); CAMBRIDGE ENTERPRISE LIMITED, Cambridge (GB)

( * ) Notice: Subject to any disclaimer, the term of this patent is extended or adjusted under 35 U.S.C. 154(b) by 190 days.

(21) Appl. No.: 13/702,700

(22) PCT Filed: Feb. 28, 2011

(86) PCT No.: PCT/EP2011/052943
§ 371 (c)(1),
(2), (4) Date: Dec. 7, 2012

(87) PCT Pub. No.: WO2011/154165
PCT Pub. Date: Dec. 15, 2011

(65) Prior Publication Data
US 2013/0084008 A1    Apr. 4, 2013

(30) Foreign Application Priority Data

Jun. 12, 2010  (EP) .................................. 10165774

(51) Int. Cl.
*G06K 9/34*       (2006.01)
*G06K 9/62*       (2006.01)
*G06T 7/00*       (2006.01)

(52) U.S. Cl.
CPC ............... *G06K 9/34* (2013.01); *G06K 9/6297* (2013.01); *G06T 7/0081* (2013.01); *G06T 7/0087* (2013.01); *G06T 2207/10016* (2013.01); *G06T 2207/10024* (2013.01); *G06T 2207/30232* (2013.01); *G06T 2207/30236* (2013.01)

(58) Field of Classification Search
USPC .......................... 382/103, 162, 173, 180, 228
See application file for complete search history.

(56) References Cited

U.S. PATENT DOCUMENTS 8,249,366 B2 *   8/2012   Mei et al. ...................... 382/224
2004/0141636 A1 *   7/2004   Liang et al. ................... 382/110

OTHER PUBLICATIONS

Vijay Badrinarayanan, et al., "Label Propagation in Video Sequences", IEEE Computer Vision and Pattern Recognition, Jun. 13, 2010, pp. 1-8.
Chaohui Wang, et al., "Segmentation, Ordering and Multi-Object Tracking using Graphical Models", IEEE 12$^{th}$ International Conference on Computer Vision, Sep. 29, 2009, pp. 747-754.
Hayit Greenspan, et al., "Probabilistic Space-Time Video Modeling via Piecewise GMM", IEEE Transactions on Pattern Analysis and Machine Intelligence, Mar. 1, 2004, pp. 384-396, vol. 26, No. 3.
Ce Liu, et al., "Nonparametric Scene Parsing: Label Transfer via Dense Scene Alignment", Computer Vision and Pattern Recognition, Jun. 20, 2009, pp. 1972-1979.
International Search Report, PCT/EP2011/052943, May 24, 2011.
European Communication, 10 165 774.0-1224, Nov. 22, 2012.

* cited by examiner

*Primary Examiner* — Phuoc Tran
(74) *Attorney, Agent, or Firm* — Sughrue Mion, PLLC

(57) ABSTRACT

A method (100) and system (300) is described for processing video data comprising a plurality of images. The method and apparatus is for obtaining for labeling of a plurality of objects or regions in an image of a sequence of images followed by label propagation to other images in the sequence based on an inference step and a model.

12 Claims, 6 Drawing Sheets

METHODS AND SYSTEMS FOR SEMANTIC LABEL PROPAGATION

CROSS REFERENCE TO RELATED APPLICATIONS

This application is a National Stage of International Application No. PCT/EP2011/052943 filed Feb. 28, 2011, claiming priority based on European Patent Application No. 10165774.0 filed Jun. 12, 2010, the contents of all of which are incorporated herein by reference in their entirety.

TECHNICAL FIELD OF THE INVENTION

The present invention relates to systems and methods for labelling of objects or regions in images in video data especially as applied to region or object recognition in video images. More particularly, the present invention relates to semi-automatic or automatic propagation of labels assigned to regions, objects or even pixels therein, a corresponding processing system and the application of such processing.

BACKGROUND OF THE INVENTION

The identification of objects in video has different applications in Medical Imaging, Content Analysis, the Film Industry, transport and vehicle control. For objects to be identified, at least during training of the system, typically a human operator label them explicitly. If all images are to be labelled manually this is time consuming.

Label propagation is a very challenging problem because it requires tracking of object regions which lack "visual identity". Adjacent video images in a sequence often have a large noise level making label propagation inherently unstable. Different problems related to labelling and performing segmentation have been discussed in the literature and solutions for facilitating these task have been proposed. One example is the use of an interactive approach whereby a distinct foreground object is precisely extracted from its background. In this approach, the user is closely involved in the refinement of the segmentation of the images. A related problem to label propagation is the colourisation problem. With a few coloured strokes on a greyscale video image, the user specifies how to colourize it in a realistic manner. Whereas the use of colourization is widely spread, converting the produced colours into a label map is not straightforward.

SUMMARY OF THE INVENTION

It is an object of the present invention to provide good methods and systems for processing video data as well as applications making use thereof. It is an advantage of embodiments according to the present invention that systems and methods are obtained providing semi-automatic or automatic propagation of labels assigned to objects, regions or pixels or groups of pixels in a sequence of video images. It is an advantage of embodiments according to embodiments of the present invention that efficient processing of video data can be obtained in combination with processing providing substantially accurate data.

The above objective is accomplished by a method and device according to the present invention.

The present invention starts from a labelled frame or more than one labelled frame, e.g. labelled start and end frames of a video sequence. How these labels are obtained is not considered to be a limitation on the present invention. For example these initial labels can be applied by hand, e.g. to the first and last frame. The present invention includes all forms of labelling of the end frames e.g. by methods such as those described in co-pending patent application WO 2009/047366 which is incorporated herewith by reference.

The present invention provides methods and apparatus to propagate class labels to all the other frames in the video sequence. The labels may be applied pixel-wise, object-wise or region-wise or combinations of these. An aspect of the present invention is the modelling of the video and its annotation as a time-series. The present invention provides methods and apparatus for implementing an inference strategy to estimate the labels.

It is an advantage of embodiments according to the present invention that systems and methods are provided that allow automated and/or automatic propagation of labels starting from one or more pre-labelled frames.

Methods according to the present invention may further comprise obtaining a label for at least one pixel, or region or object in an image. The object may comprise for example at least one of a region or a keypoint. The method comprises propagating the label in a subsequent or previous image. It is an advantage of embodiments according to the present invention that efficient and substantially accurate propagation of labels can be performed in an automatic and/or automated way. It is an advantage of embodiments according to the present invention that such propagation can be performed with a reduced or without interaction of the user.

The present invention relates to a processing system for processing video data according to any method of the present invention.

It is an advantage of embodiments according to the present invention that systems and methods are provided allowing label propagation using a directed graphical model and an inference step. The model may be a joint model of a sequences of frames and their labels. The model may be a generative probabilistic model of a sequence of frames and their corresponding labels. The model may be a sequential generative model that uses one image to generate a subsequent or previous image. The model may be a sequential generative latent variable model. For example, the model used can be a coupled Hidden Markov Model (HMM) (see FIG. 1) which is provided as only an example of the kind of model that can be used with the present invention. It is an advantage of embodiments according to the present invention that the methods and systems can be combined with user interaction for interactively correction of errors in difficult cases, resulting in an improved performance.

The system furthermore may comprise a label obtaining means for receiving at least one label for a first image, and a label propagating means for propagating the at least one label in a previous (backward) or subsequent (forward) image or images. A device can be provided for interpreting or taking action based on the output of the system. This can be for example a vehicle control system, or driver assistance system such as an alarm, a robotic system, a surveillance system for detecting a pedestrian and so on.

The present invention also relates to a computer program product for performing, when executed on a processing means, a method for processing video data.

Furthermore, a machine-readable data storage device storing the computer program product as described above and transmission of such a computer program product over a local or wide area telecommunications network.

It is an advantage of embodiments according to the present invention that a flexible but robust technique is obtained for automating the propagation of region pixel or object labels in video.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
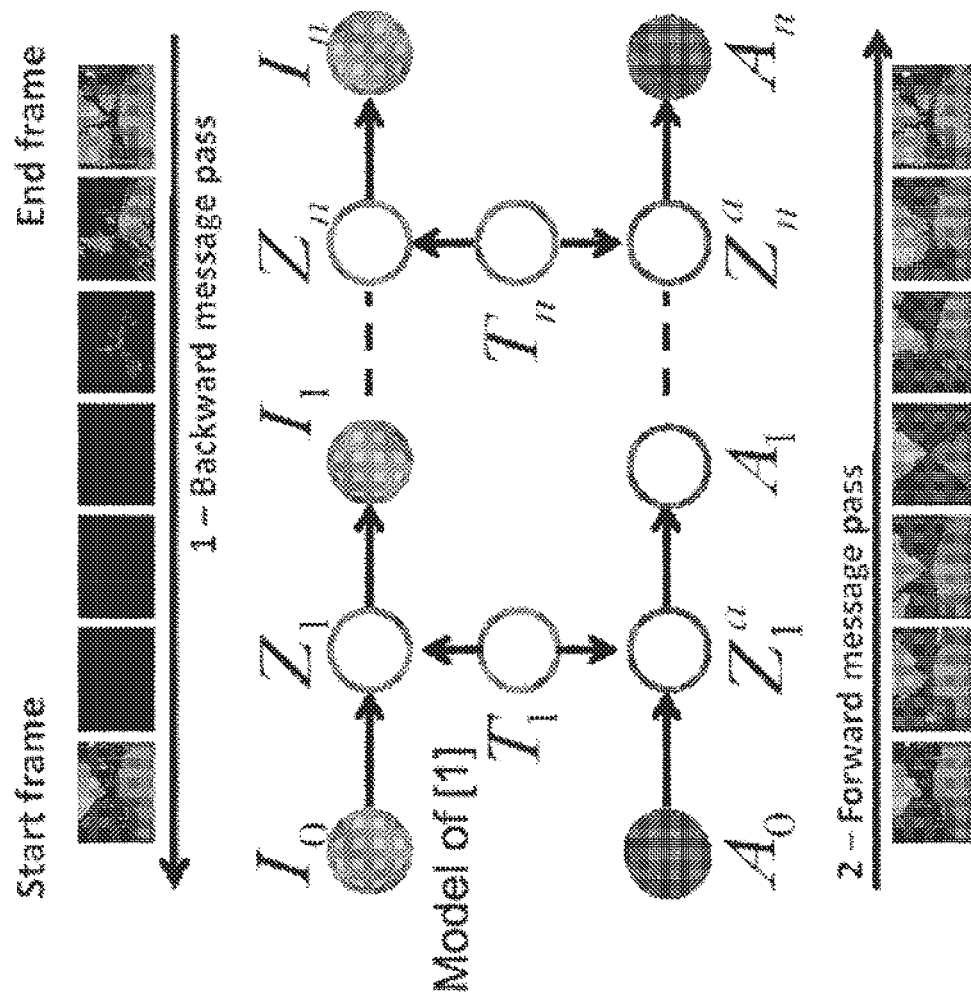
FIG. 1 is a schematic representation of a HMM model for label propagation according to an embodiment of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the term first and the like in the description and in the claims, is used for distinguishing between similar elements and not necessarily for describing a sequence, either temporally, spatially, in ranking or in any other manner. It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention. Combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

It is to be noted that the term "automatically" is used at several points in the description. In some embodiments, the automatic task may be performed after the user commands the system to do so, e.g., by a click on a graphically displayed button, and in other embodiments, the automatic task may be performed with no explicit user command, such as a click on a graphically displayed button. The terms "automatic" and "automatically" encompass both cases.

The term "first image" refers to the image used as starting point in the particular processing step. It does not need to be the first image of a sequence. Although subsequent images are used, the systems and methods according to the present invention may be applied to the image sequence in normal and/or reversed order, e.g. starting with the last image and tracking regions or labelling backwards. The term "first image" thus is only used to refer to the image for which the information is obtained or calculated and from which further processing, such as e.g. tracking or propagating, is done.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims. In a first aspect, the present invention relates to a method for processing video data comprising a plurality of images. The video data thereby may comprise a sequence of images, e.g. indicating the motion of one or more objects in a scene. The video data may be obtained in any suitable way, such as for example by capturing, e.g. using an optical detection or recording system, such as for example a camera, by calling it from a stored position in a memory, etc. The video data may comprise analogue video data or digital video. The video data may comprise 3 dimensional video data. Video data particularly of interest, although the invention is not limited thereto, is video data recorded from a moving object, such as for example a driving car. The latter may be of particular interest as one of the applications for the processing may be the use of video processing for automation and security reasons in vehicles. Appropriate processing of the video data may for example be used for recognition and reporting of main objects relevant to the moving object, e.g. vehicle, or to the driver thereof. Objects of interest may be any suitable object, such as for example and not limited to, the road, pedestrians, vehicles, obstacles, traffic lights, etc. Processing of the video data may be performed in real-time or may be performed on stored video data. Methods and systems according to embodiments of the present invention do not assume small object displacements or a high video capture frame rate.

The present invention provides a method of label propagation using a directed graphical model for label propagation in video sequences. The model may be a joint model of a sequences of frames and their labels. The model may be a generative probabilistic model of a sequence of frames and their corresponding labels. The model may be a sequential generative model that uses one image to generate a subsequent or previous image. The model may be a sequential generative latent variable model. For example, the model used can be a coupled Hidden Markov Model (HMM) (see FIG. 1) which is provided as only an example of the kind of model that can be used with the present invention. The model includes conceptually three layers of which two are chains. The top layer or chain models the sequence of images in a sequential, step-wise generative fashion. At each time-instant, a latent or hidden image is composed from a set of regions called patches from the currently observed image. The regions or patches do not need to have a semantic meaning in the image. However the regions or patches can be part of an object in the image. A patch in the latent image is matched with patches in a previous image (forward pass) or in a subsequent image (backward pass). The latent image inherits labels from the labels of the patches in the previous or subsequent image. The assignment of a label to a pixel or region in the latent image will be done with a certain probability that it is the correct label. This probability is preferably stored as well as the label itself. The latent image is used to "explain away" or "generate" the next image. The present invention preferably makes use of two inference steps and a model. In the first step includes matching between a patch in the latent image and patches in one or more previous or subsequent images. In a second step an optimum transfer of labels from the previous or subsequent image to the latent image is determined. Such a two step process can be an EM based inference strategy. The latent image is compared with the time-equivalent real image to find similarities between them. Then the labelling of the latent image may be mapped onto the current real image in an optimal way. The bottom layer or chain models correspondingly, in the discrete domain, the labelling of the latent images. The inferred labels of the latent images are the end result which can be used as labels of the sequence of images. The probability that a label is correct can be stored for each pixel or region in a latent image. The middle mapping layer connects the top and bottom Markov chains, i.e. connects the image layer with the label layer. The order of message passing is shown in FIG. 1 along with a sample of corresponding effects using thumbnail images.

As an example of the present image, an application is considered in which there are known images that are associated with specific locations, e.g. with specific positions along a road let us say at A, B, C. If a vehicle is at a position between A and B it will see a current image that is neither the image from A nor the image from B but will contain parts of both of these images. Thus there will be some overlap between the image taken at A and the image taken at B. The present invention provides methods and apparatus to compare (and subsequently label) this current image with a latent image created by propagating from an image taken at a position that was passed in the past (A) in a forwards direction and/or to compare (and subsequently label) this current image with an image created by propagating in a backwards direction from an image taken at position (B) that will be passed in the future. There are various applications of the present invention. If the current image from an automobile can be labelled based on its position somewhere between A and B then the position of the automobile can be confirmed. The images from points like A and B can be stored in an automobile navigation device such as a GPS navigational device. Hence the present invention can be used as an enhancement to a navigational system. Alternatively outputs of the present invention may be used to train other algorithms or to provide image labels for other algorithms, e.g. to pedestrian detection algorithms. The existing static images from points like A and B can be analysed according to the present invention to identify known and foreign objects in the current images taken when the automobile is between A and B to thus increase the accuracy of algorithms that detect such foreign incursions, e.g. pedestrians. A device can be provided for interpreting or taking action based on an output of the present invention. For example, the detection of pedestrians in the image using the labelling of the present invention can be used to set off an alarm or other form of warning, apply the brakes etc. This can be used for example in a vehicle control system, or driver assistance system, a robotic system, a surveillance system for detecting intruders and so on. The present invention is not limited to automobiles.

Note that the method of working can be a forward pass 2, i.e. going from a start image to a present image in the direction of a final image in a direction which is the same as the time lapse between images, and/or can be a backward pass 1. In a backward pass 1 the method starts from an image which in the time sequence will be encountered in the future and then the method moves backwards in time to the present image.

FIG. 1 shows the coupled HMM model for label propagation which is only a particular example of a model for use with the present invention. The observed (shaded nodes) and hidden variables in FIG. 1 are described in detail below.

1. $I_{0:n}$ are an observed sequence of images.
2. $Z_k$ is a latent colour image consisting of "overlapping latent colour image patches", $Z_k = \{Z_{k,j}\}_{j=1}^{\Omega}$, where j is the patch index into the set of patches $\Omega$. It is assumed these patches are mutually independent even though they share coordinates, but then to enforce agreement in the overlapping parts during inference, e.g. by resorting to a Viterbi type variational approximation. This technique allows laying down of tractable conditional distributions (Eqn 1), and the inference (line 10 in algorithm 1) allows implicit recapture of correlations between latent image patches.
3. $Z^a_k$ is a latent labelled image consisting of "overlapping latent labelled patches", $Z^a_k = \{Z^a_{k,j}\}_{j=1}^{\Omega}$. Each pixel i in patch j, $Z_{k,j,i}$, is a multinomial random variable taking one of L+1 mutually exclusive values: a void (unknown class)

label and L known class labels. Label 1 is reserved for void. Correlations between overlapping patches are captured as in $Z_k$.

4. $A_k$ is an image sized two dimensional "grid". At each co-ordinate of this grid is a set of L+1 continuous non-negative real valued random variables which sum to unity. For instance, at co-ordinate v, $\Sigma_{l=1}^{L+1} a_{k,v,l} = 1.0$.

5. $T_k = \{T_{k,j}\}_{j=1}^{\Omega}$ is the set of "patch mapping" variables which couple the top and bottom Markov chains. An instance of $T_{k,j}$ maps latent image patch $Z_{k,j}$ to an observed patch $K_{k-1,Tk,j}$ of the same size in $I_k$. The same instance of $T_{k,j}$ also maps latent labelled patch $Z^a_{k,j}$ to a patch $A_{k-1,Tk,j}$ of the same size on the grid $A_{k-1}$.

---

Algorithm 1. Proposed inference for label propagation in [1].

---

Input: Image sequence $I_{0:n}$ with user provided labels for $I_0$ and $I_n$
Output: Labels for $I_{1:n-1}$
1  Initialization $Z_k = I_k$, $k \in 1:n - Z_{1:n-1}^a = 0$; // this does not affect the iterations.
2  $Z_n^a$ is clamped to the end frame label; // for pixel v, $Z_{n,v,l}^a = 1$, if given label is class 1
   // $A_0, A_n$ initialization
3  for k = 0: n do
4  |    if k = 0, n then
5  |    |   $a_{k,v,l} = \begin{cases} 1, 0 & \text{if pixel label} = 1 \text{ and } l > 1, \\ 0, 0 & \text{if pixel label} \neq 1 \text{ and } l > 1. \\ 1, 0/(L+1) & \text{if pixel label} = 1 \text{ (void or unknown class)}, \end{cases}$
6  |    end
7  |    else
8  |    |   $a_{k,v,l} = 1.0/(L+1)$. $\forall l = 1:L+1$ // "flat" distribution
9  |    end
10 end
   // Variational approx. — 'q' function. $A_k^* = A_k$ for k = n.
11 $q(Z_{1:n}, Z_{1:n}^a, A_{1:n}, T_{1:n}) = \Pi_{k=1}^n q(T_k)\delta(Z_k - Z_k^*)\delta(Z_k^a - Z_k^{a*})\delta(A_k - A_k^*)$.
12 LabelPropagation // Note: our interest is in $Z_{1:n-1}^a$.
13 $Z_{1:n-1}^a \leftarrow$ InferLabels $(I_{0:n}, Z_{1:n}, Z_{1:n}^a, A_{0:n}, T_{1:n})$ // See alg. 2.

---

Algorithm 2: InferLabels( )

---

Input: $I_{0:n}, Z_{1:n}, Z_{1:n}^a, A_{0:n}, T_{1:n}$
Output: $Z_{1:n-1}^a$: the labels for $I_{1:n-1}$
1  E-step // Do for k = 1:n.
2  $q(T_{k,j}) \propto \Pi_{i \in j} N(Z_{k,j,i}^*; I_{k-1,T_{k,j}(i)}, \phi_{k-1,T_{k,j}(i)}) \Pi_{l=1}^{L+1} a_{k-1,T_{k,j}(i),l Z_{k,j,i,l}}^{a*} p(T_{k,j})$
3  M-step // Do for k = n - 1:1 (backward message pass), then for k = 1:n - 1 (forward message pass).
4  $\nabla Z_{k,v,l}^{a*} = \log a_{k,v,l}^* + \sum_{\substack{j=1 \\ a,t,v \in j}}^{\Omega} \sum_{T_{k,j}} q(T_{k,j}) \log a_{k-1,T_{k,j}(v),l}^* - \psi(Z_{k,v,l}^{a*} + \lambda)$ // $\psi$ is the Digamma function 5  $Z_{k,v,l}^{a*} = \begin{cases} 1 & \text{if } \nabla Z_{k,v,l}^{a*} > \nabla Z_{k,v,l'}^{a*}, l' = 1, \ldots, L+1, l' \neq l, \\ 0 & \text{otherwise.} \end{cases}$ $a_{k,v,l}^* \propto (Z_{k,v,l}^{a*} + \lambda - 1) + \underbrace{\sum_{j=1}^{\Omega} \sum_{T_{k+1,j}} \sum_{\substack{i \\ a,t,T_{k,j}(i)=v}} q(T_{k+1,j}) z_{k+1,j,i,l}^{a*}}_{b_{k,v,l}}$

---

Algorithm 2: InferLabels( )

--- which upon normalization delivers, $$\alpha_{k,v,l}^* = \frac{b_{k,v,l}}{\sum_{l=1}^{L+1} b_{k,v,l}}, l \in 1:L+1$$

1. The latent image $Z_k$ is predicted from observed image $I_k$ as follows.

$$p(Z_k | I_{k-1}, T_k) = \prod_{j=1}^{\Omega} \prod_{i \in j} \mathcal{N}(Z_{k,j,i}; I_{k-1,T_{k,j}(i)}, \phi_{k-1,T_{k,j}(i)}) \quad (1)$$

where, index j runs over all the (overlapping) latent patches $Z_k = \{Z_{k,j}\}_{j=1}^{\Omega}$. $Z_{k,j,i}$ is pixel i inside patch j at time k. $T_{k,j}(i)$ indexes the pixel $I_{k-1,T_{k,j}(i)}$ in patch $I_{k-1,T_{k,j}}$. $\mathcal{N}(Z_{k,j,i}; I_{k-1,T_{k,j}(i)}, \phi_{k-1,T_{k,j}(i)})$ is a normalized Gaussian distribution over $Z_{k,j,i}$, with mean $I_{k-1,T_{k,j}(i)}$ and variance $\phi_{k-1,T_{k,j}(i)}$.

2. The observed image $I_k$ is "explained away" by latent image $Z_k$ as shown below.

$$p(I_k | Z_k) = \prod_{v \in V} \mathcal{N}\left(I_{k,v}; \frac{1}{N_v} \sum_{\substack{j=1 \\ s,t,j \in v}}^{\Omega} Z_{k,j,v}, \psi_{k,v}\right) \quad (2)$$

where $I_{k,v}$ denotes the intensity of pixel v in the image sized grid V. j indexes patches in $Z_k$ which overlap pixel v. $\phi_{k,v}$ is the variance of the normalized Gaussian.

3. The latent labelled image $Z_k^a$ is predicted from $A_{k-1}$ as follows.

$$p(Z_k^a | A_{k-1}, T_k) = \prod_{j=1}^{\Omega} \prod_{i \in j} \prod_{l=1}^{L+1} a_{k-1,T_{k,j}(i),l}^{Z_{k,j,i,l}^a}, \quad (3)$$

where the indices on the first two products are the same as in Eqn. 1. The last term is the discrete class probability distribution of the pixel $Z_{k,j,i}^a$ in patch $Z_{k,j}^a$.

4. $A_k$ is predicted from $Z_k^a$ as shown below.

$$p(A_k \mid Z_k^a) = \prod_{v \in V} \frac{\Gamma(\alpha_{v,0})}{\Gamma(\alpha_{v,1}) \ldots \Gamma(\alpha_{v,L+1})} \prod_{l=1}^{L+1} a_{k,v,l}^{\alpha_{v,l}-1}, \quad (4)$$

which sets a Dirichlet prior on the (independent) parameters $\{t_{k,v}\}_{v \in V}$. $\Gamma$ denotes the gamma function with parameters $$\alpha_{v,l} = \frac{1}{N_v} \sum_{\substack{j=1 \\ s,t,j \in v}}^{\Omega} Z_{k,j,v,l}^a + \lambda$$

for l=1... L+1 and $a_{v,0} = \sum_{l=1}^{L+1} a_{v,l}$. Note that j indexes patches in $Z_k^a$ which overlap pixel index v in the image sized grid V. $N_v$ is the number of elements in the sum. $\lambda$ is a real positive constant (>=1.0) to avoid infinities.

The inference strategy to estimate the values of the hidden variables is summarised as a pseudo code in algorithm 1.

An Expectation-Maximisation (EM) based inference strategy can be used with embodiments of the present invention (see algorithms 1 and 2). The strategy may include two main steps as elaborated below—the E-step and the M-step.

E-Step Computations

Figure 2:
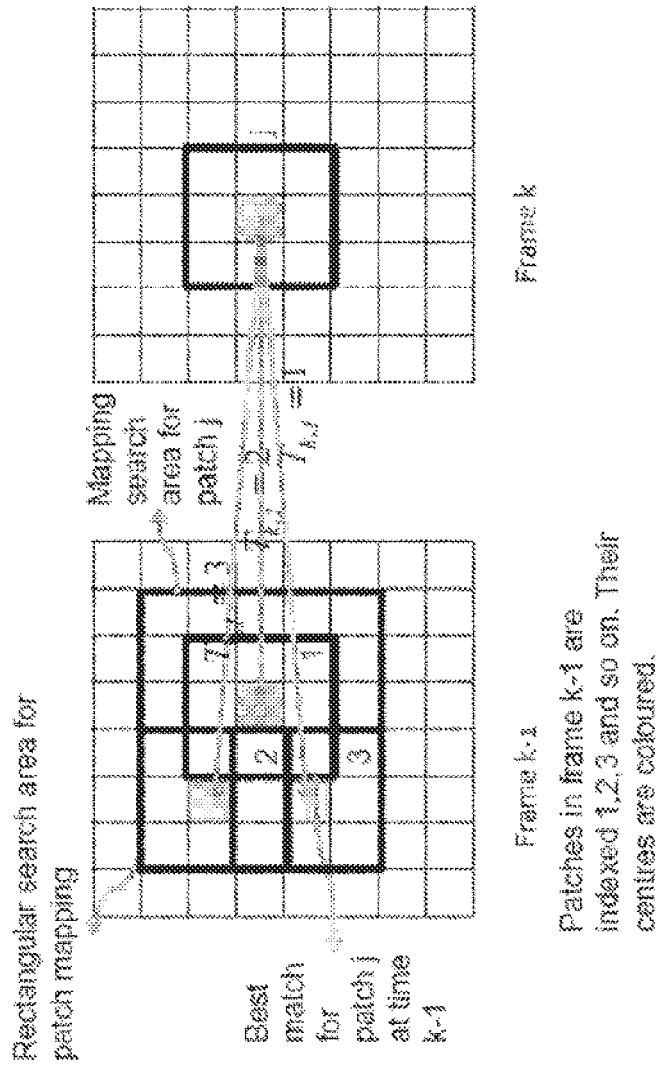
FIG. 2 is a schematic representation of E-step mapping computations. as can be used according to an embodiment of the present invention.

The E-step computes patch to patch mappings and assigns a probability to each match. The mapping is from a patch in the current latent image to a plurality of patches in one or more previous images. This is equivalent to patch cross-correlation. FIG. 2 illustrates the E-step pictorially. Each of the instances of the mapping instances $T_{k,j}$ is assigned the probability $q(T_{k,j})$. The probability $p(T_{k,j})$ is equi-probable over a rectangular search area (although other shapes of search area could be used). Patches in frame k−1 are indexed 1,2,3 and so on. Their centres are shaded. For patch j at time k the variable $T_{k,j}$ represents its mapping to another patch at time k−1. Patches are ordered and assigned a unique scalar index between 1:Ω, therefore $T_{k,j}$ takes on index values. For example, $T_{k,j}$=j' implies the event patch j at time k is mapped to patch j' at time k−1.

The E-step begins in line 1 in algorithm 2 and basically assigns a probability $q(T_{k,j})$ proportional to pixel-wise intensity matches between two patches (similar to cross-correlation). $Z^*_k$ in line 1 is simply initialized to $I_k$, therefore the normal distribution with a fixed variance computes pixel-wise intensity matches. Optionally, each colour channel of the image is treated independently, so in effect the matches in the R, G and B channels are multiplied to give the right hand side value.

In the first iteration, the values of $a_{k-1}, T_{k,j(i),J}$ have all equal initial value (see initialization step in algorithm 1) and so do not affect the right hand side. Note that due to high computational cost, the E-step is preferably performed once currently (with an C# implementation and using an 8 core processor it costs 90 s/frame). Therefore, $a_{k-1}, T_{k,j(i),J}$ does not affect the patch matches. Also, as is known from cross-correlation, a rectangular area can be searched around patch j at time k−1. The probability $p(T_{k,j})$ is preferably kept "flat" or equivalently allow mappings within the rectangle to be considered equi-probable a priori. Finally, $q(T_{k,j})$ is normalized to unity over all possible $T_{k,j}$ values. This produces something similar to a cross-correlation surface but where the sum of values on the surface is equal to unity.

To reduce the computational cost, it is preferable to only sum over the best match in line 3 of algorithm 1. That is an approximation is made of the match surface by a delta function at the best match point and it is assigned a probability 1. In line 5, where a mapping is made from time k+1 to time k ($T_{k+1,j}$), there is a need to consider all the patches in time k+1 which have their best matches to a particular patch at time k. The mappings are not one-to-one. Therefore, the linear combination in line 5 is over the patches at time k+1 and the corresponding weights are the match probabilities $q(T_{k+1,j})$. Thus, one cannot avoid computing the distribution $q(T_{k,j})$.

In an actual implementation it is preferred if the RGB channels are treated independently and the images are scaled in each colour channel between 0.0-1.0. In algorithm 2, a patch size can be selected, e.g. of 7×7 with the patch centres shifted by a pixel in both axes, and set the prior $p(T_{k,j})$ to uniform over a grid such as a rectangular grid, e.g. a 30×40 pixel-grid (rectangular search area) centred on the patch j. The search area exceeding the image border can be cut-off. The variances of all the Gaussians can be fixed to 1.0.

M-Step Computations

Figure 3:
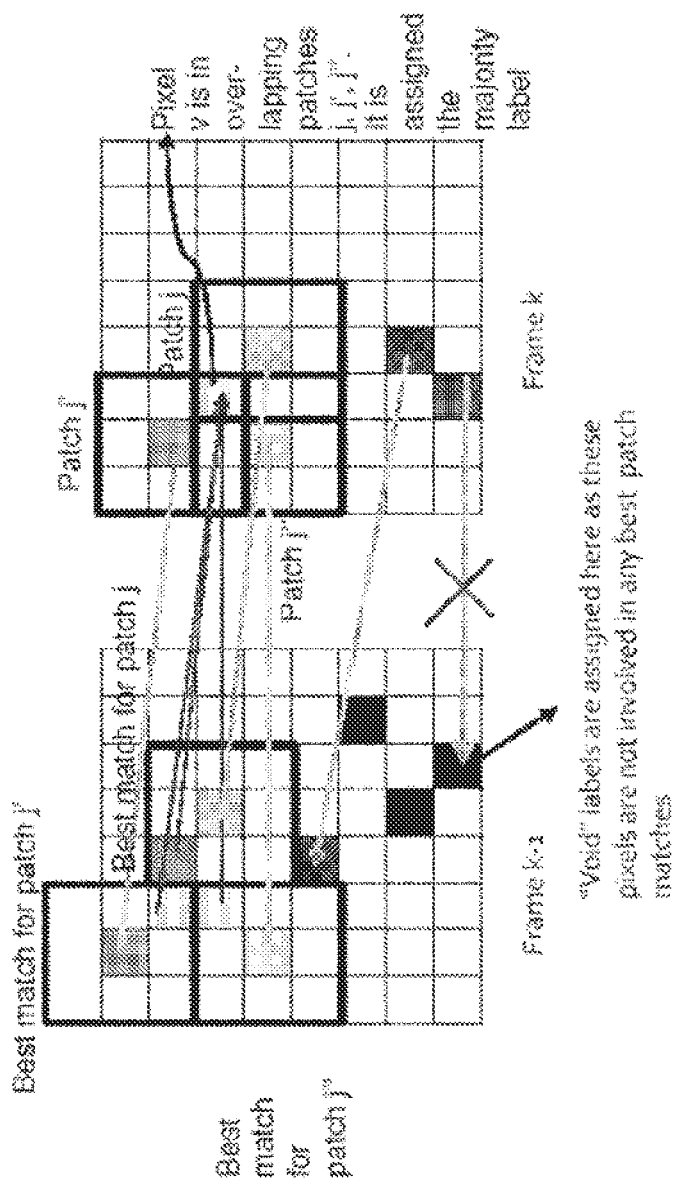
FIG. 3 is an exemplary method of a backward message pass (arrows going from right to left) and forward message pass (arrows going from left to right). "void labels" are obtained in the backward message pass according to a particular embodiment of the present invention.

The M-step consists of two passes to determine the maximum probable values of the hidden variables, the backward message pass which goes from time k=n−1:1 and a forward message pass from time k=1:n−1. In the present embodiment the model is a directed graph and two message passes are required to propagate evidence (pre-labelled data such as hand-labelled data) to every other frame in the sequence. In both passes lines 4, 5 and 6 of algorithm 2 are carried out in that order to alternately estimate $Z^a_k$ and $A_k$ variables. FIG. 3 shows the effect of forward and backward message passes in a simplified manner.

Backward Message Pass

In this pass, labels are transferred from a frame k to frame k−1. E-step mappings are computed in the causal direction, that is, for a patch j in frame k, its best match is computed at frame k−1. Due to this time asymmetry in mappings, it is possible that a patch at time k−1 is not a best match for any patch at time k. Therefore, no labels are transferred to some pixels (remember that patches overlap) at time k−1. To these pixels is assigned a void (or unknown label) and propagated backwards up to frame 2. FIG. 3 illustrates the void effect in the backward message pass effect (also see the thumbnails in FIG. 1). This is a desirable property of the backward propagation because as the method goes backwards in time it correctly assigns an unknown label to appearing parts. This effect is called "void propagation".

Forward Message Pass

In this pass, labels are transferred from a frame k−1 to frame k. The E-step mappings are in this direction too. Therefore, for a patch j in frame k there is always a best match at frame k−1. Thus, a known class label is transferred to pixels in frame k and so on until frame n−1. This front propagation step may be viewed as a label "filling step" where the voids created in the backwards propagation are set to some known class (see FIG. 1). This creates an overall smooth labelling of the video sequence and is very effective over short sequences (25-50 frames) where most of the appearing scene can be nearly seen from the first frame (hand-labelled frame). However, over long sequences, this can be a harmful effect of "blindly" filling-in known class labels, where a void (unknown class or uncertain label) would be more appropriate especially towards the middle of the sequence. Therefore, the front propagation to an extent mitigates the desirable void propagation performed in the backward pass. This negative filling effect is a direct consequence of the directionality (causality) of the mappings. Thus, the proposed model is a time-asymmetric one which is less applicable to long sequences.

Figure 4:
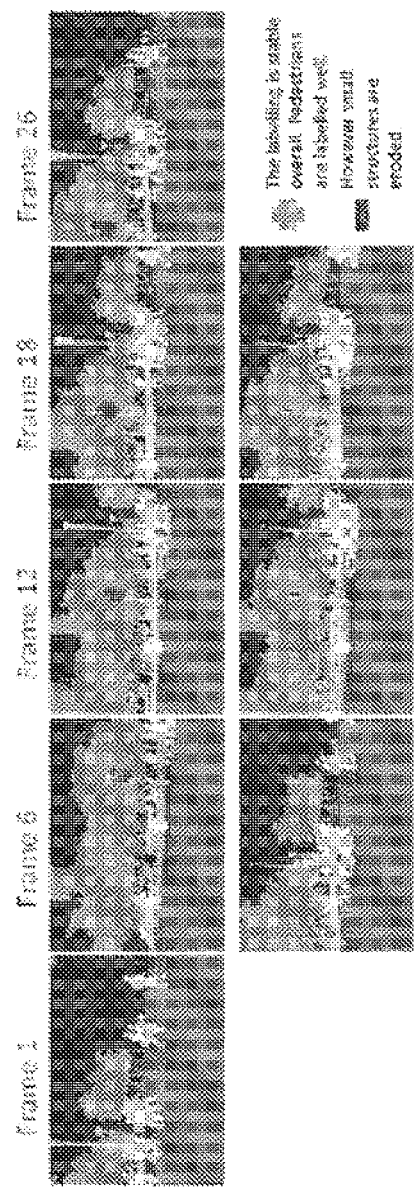
FIG. 4 is a schematic representation of a video sequence in accordance with the present invention in which frames 1 and 25 on the top row are user provided labels. Ground truth for frames 6, 12 and 18 are provided for comparison on the top row.

FIG. 4 shows how the simple and effective methods of the present invention, e.g. based on rectangular patches matches, automatically labels frames in a video sequence, given only two pre-labelled frames. In FIG. 4 frames 1 and 25 on the top row have user provided labels. Ground truth for frames 6, 12 and 18 are provided for comparison on the top row. The proposed method propagate labels fairly accurately under a panning motion.

The present invention will mainly be applied to real video data, i.e. video images taken of real surroundings and not video data that has been generated by computer. The method operates on video data comprising a plurality of images, i.e. on an image sequence of video data. This image sequence may be already available at the initiation of the method. Alternatively, an optional step of obtaining the video data comprising a plurality of images first may be performed. Such obtaining may be receiving stored video data, e.g. on an optical disk or via a network, or may be acquiring video data by recording using a camera. The latter may result in obtaining real-time or streaming video as well as obtaining a full video data set at the time, which then may be locally stored for processing. In some embodiments, the image sequence may be available from a testbed. The latter may for example be used when training a system for recognition of objects in video data is performed. The plurality of images thereby does not need to comprise all frames of a video sequence as originally recorded, but may for example be only a selected part thereof, depending on the images of interest and the required accuracy of the processing. Advantageously, the video data comprises consecutive images, but the time lapsed between different consecutive frames may for example be selected in view of the required accuracy. In one example, the lapsed time between the consecutive frames may be limited which may result in smaller differences between the images. Alternatively or in addition thereto, performing pre-smoothing may be done in order to sub-sample. The latter may allow that the system can run at smaller resolutions as the scenes may be easier. The resolution and/or the frame-rate may be relatively low when the vehicle is moving slowly or stuck in traffic. By way of example, a frame-rate of 30 frames per second for normal driving in a city may be fine. It is an advantage of embodiments according to the present invention that the method does not intrinsically rely on high frame rate, unlike motion-based methods.

The obtained label information furthermore may be used for particular applications. One example of an application may be the automated driving of vehicles, whereby the video processing may be used for recognising the main objects during the journey and, such as for example the main objects relevant to the driver of the vehicle like the road, pedestrians and vehicles, and wherein the obtained information about the objects during the journey is taken into account for the automated driving, e.g. for keeping track on the road, for avoiding collision with another object, etc. The method may then for example be used for a plurality of video data, e.g. recorded in different directions, and the obtained object information may be combined with other types of information such as speed sensors, position information, sound sensors, motion sensors, etc. An alternative application may be the use of label information for training systems or people for labelling video data.

Figure 5:
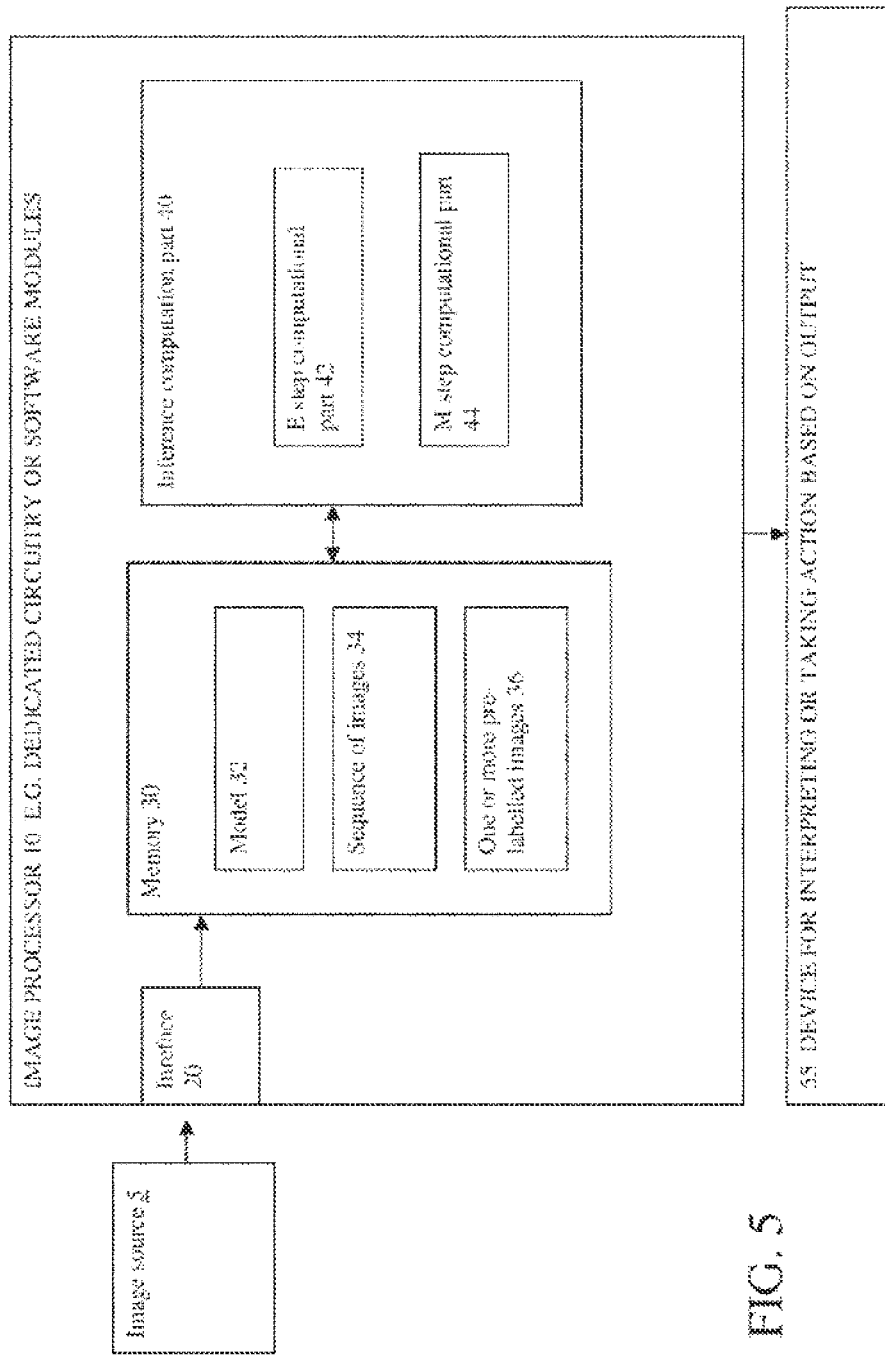
FIG. 5 is an illustration of an image processor or processing system according to an embodiment of the present invention.
Figure 6:
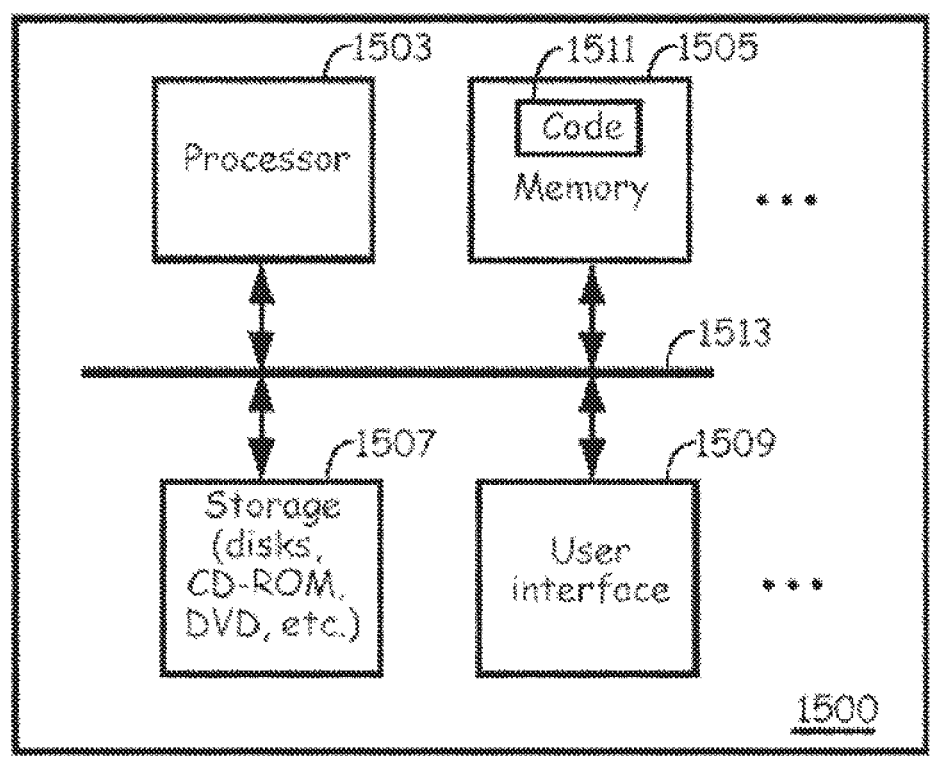
FIG. 6 is an illustration of a processing system whereon a method according to embodiments of the first aspect of the present invention can be implemented.

FIG. 5 shows an image processor or processor system 10 according to an embodiment. FIG. 6 shows steps carried out by this or other embodiments. The image processor or processor system 10 can be implemented as for example one or more integrated circuits having hardware such as circuit blocks dedicated to each of the parts shown, or can be implemented for example as software modules executed by a general purpose processor in sequence, as in a server. The parts shown include an input interface 20 for receiving an input image or image stream (such as frames of a video, in real time or non real time) from an image source device 5 such as a video camera or an optical disk such as a DVDROM or a CDROM or a solid state memory device such as a USB stick. The images or frames of the video sequence are stored in part 34 of a memory 30. Also input to the system are one or more labeled images that are stored in part 36 of memory 30. In addition a model of the images is stored a part 32 of the memory. The model may be a joint model of a sequences of frames and their labels. The model may be a generative probabilistic model of a sequence of frames and their corresponding labels. The model may be a sequential generative model that uses one image to generate a subsequent or previous image. The model may be a sequential generative latent variable model. For example, the model used can be a coupled Hidden Markov Model (HMM). The processor 10 also has an inference computational part 40. This part 40 is for carrying out any of the methods of the present invention involving the inference step. For example the part 40 may include a E step and an M step computational part (42, 44 respectively) which process the image data in memory parts 34 and 36 in order to propagate the labels. A device 55 can be provided for interpreting or taking action based on an output of the present invention. Such an output can be used to provide an alarm (e.g. derived from the labeling of the images with the labeling associated with a pedestrian or in conjunction with a further algorithm that detects pedestrians in images and uses the labeling of the present invention as additional information as to the content of images to make the identification of pedestrians more accurate. The output can be an alarm, a braking effect, etc.

In a further aspect, the present invention relates to a system for processing video data and adapted for obtaining label information for the plurality of images. The different components of system may comprise processing power for performing their function. The functionality of the different components of the system 300 or different method steps of the method 100 may be implemented in separate or a joint processing system 400 such as shown in FIG. 6. FIG. 6 shows one configuration of processing system 400 that includes at least one programmable processor 403 coupled to a memory subsystem 405 that includes at least one form of memory, e.g., RAM, ROM, and so forth. It is to be noted that the processor 403 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system may include a storage subsystem 407 that has at least one disk drive and/or CD-ROM drive and/or DVD drive. In some implementations, a display system, a keyboard, and a pointing device may be included as part of a user interface subsystem 409 to provide for a user to manually input information. Ports for inputting and outputting data also may be included. More elements such as network connections, interfaces to various devices, and so forth, may be included, but are not illustrated in FIG. 6. The various elements of the processing system 400 may be coupled in various ways, including via a bus subsystem 413 shown in FIG. 6 for simplicity as a single bus, but will be understood to those in the art to include a system of at least one bus. The memory of the memory subsystem 405 may at some time hold part or all (in either case shown as 411) of a set of instructions that when executed on the processing system 400 implement the steps of the method embodiments described herein. Thus, while a processing system 400 such as shown in FIG. 6 is prior art, a system that includes the instructions to implement aspects of the methods for processing the video data is not prior art, and therefore FIG. 6 is not labelled as prior art.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

It is to be understood that although preferred embodiments, specific constructions and configurations, as well as materials, have been discussed herein for devices according to the present invention, various changes or modifications in form and detail may be made without departing from the scope of this invention as defined by the appended claims. For example, whereas an application system has been described, the present invention also relates to a method for controlling an application system by processing video data according to a method for processing and deriving from the processed video data control instructions for controlling the application system.

Furthermore, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for processing video data comprising a plurality of images, the plurality of images having an earlier and later frame of a video sequence, having a label for at least a first region or patch in the earlier frame and at least a second region or patch in the later frame, the method comprising:
   obtaining a directed graphical model of the plurality of images; and
   using the directed graphical model to propagate the label of the first and/or second region or patch to at least one other image of the sequence, the propagating being by a probabilistic method for estimating the label in the other image by a directed graphical method.

2. The method of claim 1, wherein the directed graphical model is selected from among a joint model of the plurality of images and their labels, a generative probabilistic model of the plurality of images and their corresponding labels, a sequential generative model that uses one image to generate a subsequent or previous image, a sequential generative latent variable model, and a Hidden Markov model.

3. The method according to claim 1, wherein the method determines an uncertainty in the estimated label using predictions from a later and/or an earlier frame.

4. The method of claim 1, wherein the images have colour channels and each colour channel is processed independently.

5. The method of claim 1, wherein the estimating of the label in the other image includes a forward pass from an earlier frame and a backwards pass from the a later frame.

6. The method of claim 5, wherein the label in the other image is selected from a plurality of regions or patches in the earlier or later image, the estimated region or patch being one with the highest intensity match between the regions or patches in the earlier or later image and the region or patch in the other image.

7. A processing system for processing video data comprising a plurality of images, the plurality of images having an earlier and a later frame, having a label for at least a first region or patch in the earlier frame and at least a second region or patch in the later frame, the system comprising:
   a directed graphical model of the plurality of images stored in memory; and
   a label propagating means for propagating the label of the first and/or second region or patch to at least one other image of the sequence, the propagating being by a probabilistic method for estimating the label in the other image by a directed graphical method.

8. The system of claim 7, wherein the directed graphical model is selected from among a joint model of the plurality of images and their labels, a generative probabilistic model of the plurality of images and their corresponding labels, a sequential generative model that uses one image to generate a subsequent or previous image, a sequential generative latent variable model, and a Hidden Markov model.

9. The system according to claim 7, comprising means to determine an uncertainty in the estimated label using predictions from a later and/or an earlier frame.

10. The system of claim 7 wherein the images have colour channels and each colour channel is processed independently.

11. The system of claim 7, wherein the label propagating means is adapted to estimate the label in the other image by a forward pass from the earlier frame and a backwards pass from the later frame.

12. A computer program product having a non-transitory computer-readable medium storing instructions that when executed by a processor, causes the processor to:
   obtain a directed graphical model of a plurality of images in a sequence; and
   use the directed graphical model to propagate a label from a first and/or second region or patch to at least one other image of the sequence, the propagating being by a probabilistic method for estimating the label in the other image by a directed graphical method.

* * * * *